(12) United States Patent
D'Souza et al.

(10) Patent No.: US 12,360,763 B2
(45) Date of Patent: *Jul. 15, 2025

(54) COMPUTER-BASED SYSTEMS CONFIGURED TO DECOUPLE DELIVERY OF PRODUCT CONFIGURATION CHANGES ASSOCIATED WITH CONTINUOUS INTEGRATION/CONTINUOUS DELIVERY PROGRAMMING PIPELINES AND METHODS OF USE THEREOF

(71) Applicant: Capital One Services, LLC, McLean, VA (US)

(72) Inventors: Stalin D'Souza, Brooklyn, NY (US); Charles Wang, New York, NY (US); Stephen Mendez, Dix Hills, NY (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/663,992

(22) Filed: May 14, 2024

(65) Prior Publication Data

US 2024/0296045 A1 Sep. 5, 2024

Related U.S. Application Data

(63) Continuation of application No. 17/883,025, filed on Aug. 8, 2022, now Pat. No. 12,020,023.

(51) Int. Cl.
*G06F 8/71* (2018.01)
*G06F 8/656* (2018.01)

(52) U.S. Cl.
CPC ............... *G06F 8/71* (2013.01); *G06F 8/656* (2018.02)

(58) Field of Classification Search
CPC ..................... G06F 8/71; G06F 8/656
(Continued)

(56) References Cited

U.S. PATENT DOCUMENTS 9,183,123 B2 11/2015 Spektor et al.
10,216,509 B2 2/2019 Martin et al.
(Continued)

FOREIGN PATENT DOCUMENTS

CN 108874650 A 11/2018
CN 112416524 A 2/2021

OTHER PUBLICATIONS

Sara Moreno; "Advanced Design Frameworks for Modern, Scalable Applications: Strategic Approaches to Building High-Performance, Resilient, and Modular Architectures in Distributed Systems"—Department of Computer Science, Universidad de la Sierra Nevada, Nov. 12, 2020.*

(Continued)

*Primary Examiner* — Francisco J Aponte
(74) *Attorney, Agent, or Firm* — Greenberg Traurig, LLP

(57) ABSTRACT

Systems and methods are disclosed for providing a CI/CD pipeline that decouples delivery of product configuration changes from code and similar changes, otherwise bundled/handled together with such configuration changes, for delivery to a running application in production. An exemplary method may include configuring components of CI/CD application in production to subscribe to application updates during runtime; processing an update to the application; processing/handling the update to process only configuration changes for propagation to subscribed components; validating the configuration changes; and instructing a workflow engine to: determine whether the configuration changes are needed for each component, update the components in runtime memory, if so, and provide the validated changes as (Continued)

an update in a next processing cycle to deploy such changes during the runtime.

18 Claims, 7 Drawing Sheets

(58) Field of Classification Search
USPC .......................................................... 717/121
See application file for complete search history.

(56) References Cited

U.S. PATENT DOCUMENTS

| | | | |
|---|---|---|---|
| 10,303,586 B1 | 5/2019 | Falko | |
| 10,534,701 B1 | 1/2020 | Pande et al. | |
| 10,728,364 B1 | 7/2020 | Licata et al. | |
| 10,740,115 B2 | 8/2020 | Goetz et al. | |
| 10,802,954 B2* | 10/2020 | Govindaraju | G06F 11/3688 |
| 10,866,788 B2 | 12/2020 | Reddy | |
| 10,884,897 B2 | 1/2021 | Barbee et al. | |
| 11,074,068 B1 | 7/2021 | Bogushefsky, III et al. | |
| 11,137,998 B2 | 10/2021 | Liu et al. | |
| 11,231,922 B2 | 1/2022 | Ahuja et al. | |
| 11,343,142 B1* | 5/2022 | Wang | H04L 67/1097 |
| 11,537,367 B1 | 12/2022 | Bhattacharyya | |
| 11,947,946 B1* | 4/2024 | Rao | G06N 20/20 |
| 12,020,023 B2* | 6/2024 | D'Souza | G06F 8/71 |
| 2019/0138288 A1 | 5/2019 | Brealey et al. | |
| 2020/0110598 A1* | 4/2020 | Liu | G06F 21/31 |
| 2020/0257514 A1 | 8/2020 | Gadgil et al. | |
| 2020/0301763 A1 | 9/2020 | Chandoor et al. | |
| 2020/0389543 A1 | 12/2020 | Swope et al. | |
| 2021/0124576 A1 | 4/2021 | Gungabeesoon et al. | |
| 2021/0224062 A1 | 7/2021 | Baldassarre et al. | |
| 2021/0303296 A1 | 9/2021 | Ahuja et al. | |
| 2022/0019524 A1* | 1/2022 | Ramachandran | G06F 11/3696 |
| 2022/0057999 A1 | 2/2022 | Pitchai et al. | |
| 2022/0083245 A1 | 3/2022 | Kant et al. | |
| 2022/0129301 A1 | 4/2022 | Adeyenuwo | |
| 2022/0206880 A1 | 6/2022 | Thota et al. | |
| 2022/0283801 A1 | 9/2022 | Hoenzsch et al. | |
| 2023/0086361 A1 | 3/2023 | Wan et al. | |
| 2023/0093370 A1 | 3/2023 | Battaglia et al. | |
| 2023/0106675 A1 | 4/2023 | Pande et al. | |
| 2023/0138602 A1 | 5/2023 | Bregman et al. | |
| 2023/0161693 A1 | 5/2023 | Herington et al. | |
| 2023/0229546 A1 | 7/2023 | Goad | |
| 2023/0409305 A1 | 12/2023 | Bregman et al. | |
| 2024/0028330 A1* | 1/2024 | Yang | G06F 8/60 |
| 2024/0036858 A1 | 2/2024 | Pulugurtha et al. | |
| 2024/0045669 A1 | 2/2024 | D'Souza et al. | |
| 2024/0134979 A1* | 4/2024 | Kravtsov | G06F 21/577 |
| 2024/0143301 A1* | 5/2024 | Adams | G06F 8/61 |
| 2024/0243986 A1* | 7/2024 | Rulfs | G06F 11/1441 |

OTHER PUBLICATIONS

International Search Report and Written Opinion from International Application No. PCT/US2023/029782 dated Oct. 24, 2023.

N. Railic et al., "Architecting Continuous Integration and Continuous Deployment for Microservice Architecture," 2021 2oth International Symposium INFOTEH-Jahorina (INFOTEH), East Sarajevo, Bosnia and Herzegovina, 2021, pp. 1-5, doi: 10.1109/INFOTEH51037.2021.9400696.

* cited by examiner

COMPUTER-BASED SYSTEMS CONFIGURED TO DECOUPLE DELIVERY OF PRODUCT CONFIGURATION CHANGES ASSOCIATED WITH CONTINUOUS INTEGRATION/CONTINUOUS DELIVERY PROGRAMMING PIPELINES AND METHODS OF USE THEREOF

COPYRIGHT NOTICE

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC., All Rights Reserved.

FIELD OF TECHNOLOGY

The present disclosure generally relates to an improved computer-based platform or system, improved computing devices and/or improved computing methods configured for one or more novel technological applications that involve processing of updates/changes associated with software applications being executed in connection with a continuous integration/continuous delivery (CI/CD) pipeline.

BACKGROUND OF TECHNOLOGY

A computer network platform or system may include a group of computers (e.g., clients, servers, smart routers, etc.) and other computing hardware devices that are linked together through one or more communication channels to facilitate communication, software management and/or coordinating separate processes, such as with execution in cloud-based computing environments.

Software developers often use continuous integration/continuous delivery (CI/CD) pipelines to build applications or functionality for desired environments by requisitioning and coordinating separate cloud processes. At present, updates being promulgated through integration and build processes can be limited by numerous restraints such as, without limitation, the excessive time overhead to propagate all changes (e.g., configuration changes along with code/other changes that, together, determine runtime behavior) through a full pipeline deployment, infrastructure risk (undesired usage, avoiding create and replace, etc.), wasted compute resources spent re-integrating and/or re-building using code that hasn't changed, avoiding unnecessary dependencies (e.g., during testing, etc.), and the like. Further, while there exist limited, costly and/or inefficient alternatives like standing up a self-service framework that involve more time/cost investment that goes beyond the software development scope and is often bespoke to the use case, there are generally no satisfactory mechanisms for providing an efficient and effective alternative for use cases a) that are not approved for deeper investment but need a gap fill solution or b) where investment can be approved but can't wait the usual drawn out timeline to deliver the end-state solution. In sum, there is a need for systems and methods that overcome the above, other, or related drawbacks, and/or impart other advantages.

OVERVIEW OF SOME DESCRIBED SUBJECT MATTER

In some embodiments, the present disclosure provides various exemplary technically improved computer-implemented methods for delivery of product configuration changes associated with software applications involved with a CI/CD pipeline, including a method having steps such as:
configuring, by one or more processors of a continuous integration and delivery (CI/CD) pipeline, one or more components of an application in production to subscribe to (receive) updates involving the application during runtime, the application being executed in the CI/CD environment;
receiving/processing, by the one or more processors, an update to the application, the update comprising configuration changes;
analyzing, by the one or more processors, the update to process the configuration changes, as de-coupled from code changes, for propagation to subscribed components via the CI/CD pipeline;
validating, by the one or more processors, the configuration changes to form validated configuration changes;
instantiating (calling-up), by the one or more processors, a file processor that is configured to:
store the validated configuration changes to at least one datastore;
notify the one or more components of the application of the configuration changes; and
instructing, by the one or more processors, a workflow engine associated with the one or more components to:
determine/validate whether the configuration changes are needed for each component;
update the each components in runtime memory with the validated configuration changes, and
provide the validated configuration changes as an update in a next processing cycle so as to deploy the validated configuration changes during the runtime.

It is to be understood that both the foregoing general description and the following detailed description are exemplary and explanatory only and are not restrictive of the disclosed technology. Further features and/or variations may be provided in addition to those set forth herein. For example, the present invention may be directed to various combinations and subcombinations of the disclosed features and/or combinations and subcombinations of several further features disclosed below in the detailed description.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
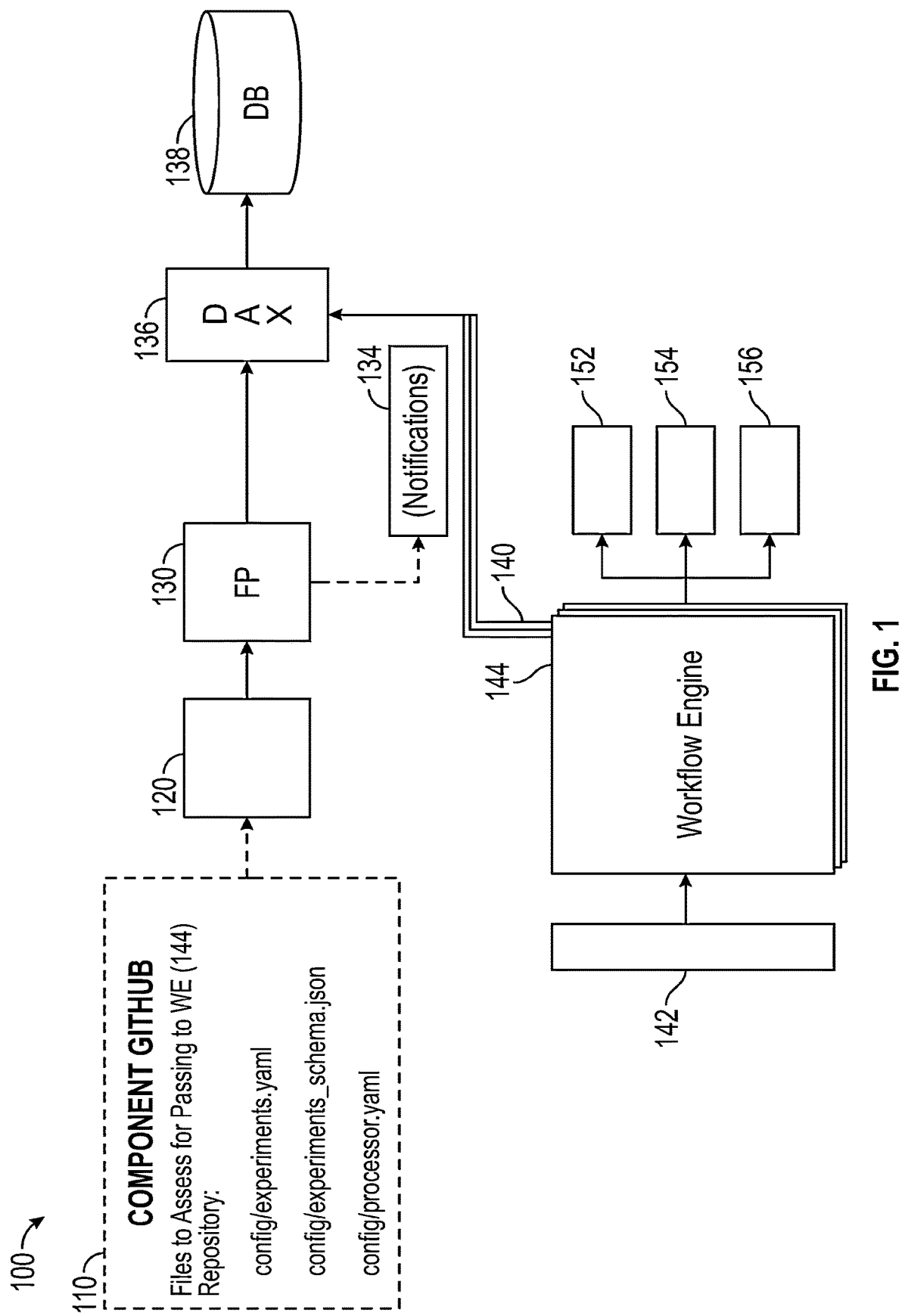
FIG. 1 is a block diagram depicting illustrative system architecture and functionality of an exemplary dynamic CI/CD configuration pipeline, consistent with exemplary aspects of certain embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

Systems and methods of providing a CI/CD pipeline that processes only product configuration changes as separated from code changes, which in prior solutions were typically bundled/handled together, are disclosed. According to certain implementations, for example, product setting changes may be delivered in improved ways to a running application in production, avoid propagation of unaltered code changes through the full pipeline deployment, including code scans, tests, building new infrastructure, and deploying code that ultimately turns on live traffic. In on embodiment, an exemplary method may include: configuring components of CI/CD application in production to subscribe to application updates during runtime; receiving/processing an update to the application; analyzing the update to process only the configuration changes, as decoupled from the code changes, for propagation to subscribed components; validating the configuration changes; and instructing a workflow engine to: determine whether subject configuration changes are needed for each component, update, in runtime memory, the components determined to require the subject configuration changes, and provide the validated changes as an update in a next processing cycle to deploy such changes during the runtime.

As set forth in more detail, below, systems and methods disclosed herein provide a new dynamic configuration CI/CD pipeline that decouples delivery of product configuration changes from all other updates/changes, referred to as code changes herein (e.g., code updates, static updates, system configurations, etc.), where both of which are typically bundled and handled together in existing solutions. In one example, certain example implementations may deliver only the needed product setting changes (e.g., business rules, product mappings, etc.) to a running application in production. As a function of these and/or other aspects, systems and methods herein may expedite or optimize a development workflow, including delivering results without the time overhead as well as avoiding dependencies (e.g., testing code that hasn't changed) and infrastructure risks (e.g., change, usage, etc.) of current solutions. As such, according to illustrative implementations herein, the present systems and methods may be constructed and/or operated as set forth below, to be performed in a sequence of pipeline steps such as: 1) process an update to a product configuration to extract just the configuration files for propagation; 2) validate the config files (e.g., by validating against a schema) and, once validated, call-up a file processor (e.g., Amazon AWS lambda λ processor, etc.) to write/insert the config entry into a database; 3) send a notification of the update to all subscribing components, in response to which such subscribing components pull-in the new config; and 4) validate, in connection with an workflow engine (WFE), the config update while running live traffic, update components' runtime in memory with the new config, and provide the new config as an update in the next processing cycle. Here, while such steps are described herein for the sake of convenience as these four parts, it should be noted that such arbitrary subdivision is for the sake of discussion, and subset(s) or differing combination(s) of such functionality, e.g., expressed in any other way or sequence, may form all or part of the innovations herein.

Turning to this illustrative implementation, an exemplary pipeline may be configured, e.g. in a first phase, i.e. phase 1), to process an update to a product configuration to extract just the configuration files for propagation. Here, for example, the pipeline may process the updated product configuration information received, e.g., from GitHub or the equivalent, actioning the configuration files by design, for utilization in the pipeline processing.

Further, in disclosed embodiments, such pipeline is also configured, in the second phase, i.e. 2), to validate the config files, and then to call-up a file processor, once validated, that will be utilized to write/insert the config entries into a database 138. Here, for example, such validation may take the form of validating format and/or content of the subject files against a schema, wherein such schema validation mechanism is provided via a user-provided schema. In some embodiments, such schema or schema validation mechanism may determine whether or not the configuration files are utilized in the downstream pipelines processing required to complete the test, update, etc. being performed. Further, once the configuration changes or files are validated and written to the database, the file processor may be configured to send notifications (e.g., SQS topic/message, etc.) to all components subscribed or waiting to ingest each update, e.g., once it is validated or approved.

Further, according to embodiments herein, once the file processor has been called-up, in phase 2), such file processor is configured, in phase 3), to: (a) take the new config information and write it to the database, e.g., as table entries. According to implementations herein, for example, the writes may be performed using a write-through cache and a DynamoDB/DAX layer, to expedite writing/reading. Further, according to aspects of the disclosed technology, embodiments may broadcast the configuration change to the SQS topic and allow any interested party to a) subscribe to the notice and/or b) take an action upon consuming the notice.

Next, e.g. also in the third phase, 3), various exemplary pipeline processing herein may be configured to enable all subscribing components to pull-in the new config information for validation and handling of the config update(s).

Finally, according to such illustrative implementation, the pipeline may be configured, e.g. in connection with a fourth phase 4), occurring through connection 140 and by consumption-side components (i.e., components 142, 144, 152, 154, 156 involved with integrating the configuration changes), to validate the config update while running live traffic, update the subscribed components' runtime in memory with the new config information (e.g., store the config info as the latest setting, etc.), and thereby provide the new config as an update in the next processing cycle. Further, according to various embodiments herein, processing associated with such fourth stage may be performed in connection with a workflow engine 144, as described in more detail in connection with FIG. 1, immediately below.

FIG. 1 is a block diagram depicting aspects of illustrative system architecture and functionality of an exemplary dynamic CI/CD configuration pipeline, consistent with exemplary features of certain embodiments of the present disclosure. Referring to FIG. 1, the exemplary diagram illustrates a first component or step 110 (e.g., GitHub, etc.), from which the updated product configuration files/information are obtained, a second component or step 120, at which an initial orchestration/validation phase of pipeline processing are performed (e.g., running scripts that pull-in/ intake the config files and schema, specify repository configuration paths, etc.), a third component or step 130 at which a file processor may be called-up or instantiated, at least one database 138 or data store into which the new configuration updates/changes are written, an (optional) element 136, which may include or involve a write-thru cache and/or a DynamoDB/DAX layer, via which the configuration information may be written, and several components or aspects 142, 152, 154, and 156 associated with an workflow engine 144 that are involved with integrating the actual configuration changes.

Turning to the exemplary first component or step 110, FIG. 1 illustrates an exemplary component at 110, such as GitHub, that the CI/CD pipeline traditionally accesses to obtain updates and changes, i.e., both code and configuration charges, to pass such changes into the production environment. As background, updates and changes obtained through such first component or step 110, traditionally comprise both code changes as well as configuration changes. Further, in this sense, such configuration changes may include system configuration(s), e.g., changes that are set up initially, are static, etc., as well as business-specific changes, such as business rules, product mappings, nuances that change with status of the business, and the like. The configuration changes may take the form, for example, of files, referred to as configuration files herein, such as .yaml files, .json files, and other file formats found in GitHub (e.g., config/experiments.yaml, config/experiments_schema.json, config/processor.yaml, etc.). In general, systems and methods herein will pick-up the desired configuration files, i.e., the configuration changes desired or needed for the downstream pipeline processing, from the first component 110 or at this step 110, while leaving behind (not writing) any code changes that aren't needed for the dynamic CI/CD pipeline processing detailed below.

In the exemplary second component or step 120 of FIG. 1, an initial validation phase of pipeline processing is performed. At this point, for example, embodiments of the disclosed technology may specify repository configuration paths, perform other initial validation steps (e.g., gate checks, etc.), validate the config content against a schema, and the like, e.g., to verify that the format of the configuration file(s) to be utilized are valid, and/or to otherwise validate the configuration files as those that need to be written to the database 138 for acquisition and use by the workflow engine 144. In certain implementations of the disclosed technology, the CI/CD execution environment (e.g., Jenkins, etc.) may be utilized to perform gate checks desired during this initial validation phase, wherein such gate checks prevent leakage of faulty configurations into the production environment that could cause downstream impacts. According to some embodiments, such validating the configuration files and/or changes may comprise validating at least one of: a content of the configuration changes, a format of the configuration changes, and/or a schema of the configuration changes.

Next, according to the third component or step 130 of FIG. 1, a file processor is called up, at 130, and may be implemented to perform various tasks. Here, for example, the file processor may be implemented, inter alia, to: write each validated configuration file as an entry in a database 138, (optionally) utilize an in-line/write-through cache layer 136 (e.g., AWS DAX, etc.) to write the configuration entry into the database 138 or datastore, and/or to generate/send a notification to subscribed components that need to ingest relevant configuration changes into their run-time.

With regard to writing the validated configuration changes to the database 138, according to embodiments herein, the file processor 130 may be configured to write the validated configuration changes using an (optional) write-through cache or DAX layer 136, which speeds-up and/or optimizes the writes (configuration files or changes) being saved to, as well as data being read from, the table entries of the database 138.

With regard utilizing a write-through cache or DAX layer 136 to write or read the configuration entries to/from the database 138, embodiments of the present systems and methods may utilize a write-through cache or DAX layer 136 to one or both of speed-up and/or optimize writing to and reading from the database 138. Namely, here, use of a write-through cache and/or a DAX layer provide specific benefits such as reducing the complexity of separately updating two datastores (for main content and cached content), i.e., the write-aside cache approach. This is achieved, in one example embodiment, by leveraging a pre-built write-through cache system, e.g. DAX, etc., that internalizes this logic.

With regard to generating notifications 134, according to embodiments herein, such notifications may be transmitted to components that have subscribed to receive updates/ changes regarding a subject configuration change. Here, for example, once a subject configuration change has been written to the database, all components that are subscribed to receive such subject configuration change are notified of the update or change. Consistent with the present implementations, any components that need to ingest these configuration changes into their runtime may be subscribed, i.e., notified of the configuration changes once they are established (e.g., written to the database as a configuration entry into a table, etc.).

In still further implementations, at the third component or step 130, the file processor may be configured to allow performance of additional, customized processing, such as by providing functionality that allows product owners to self-service the settings changes, or to perform customized processing on content. In one implementation, the disclosed technology may enable the product owner to perform customized processing on content automatically before the configuration changes are written to the database, via inclusion of at least one post-hook mechanism. Here, for example, one or more post-hook mechanisms may be implemented to decouple the content, so that it can be manipulated, customized, etc., automatically, once the configuration changes have been written. Among other benefits, provision of customized processing in this manner increases efficiency and/or resource allocation via one or both of increasing velocity and/or preserving engineering capacity for the delivering the updates and changes. Further, while such functionality is introduced and described, here, in the context of embodiments where the file processor 130 is configured to perform such additional, customized processing, it should be noted that other components or stages of the CI-CD pipeline may be configured to implement such functionality.

Once the configuration changes have been established and the components that need to ingest the configuration changes have been notified, processing then proceeds to a workflow engine 144 and associated components or processes, e.g., those upstream 142, and/or those downstream 152, 154, 156. According to embodiments herein, the workflow engine 144, which may comprise multiple instances, may be configured to receive the notification and react to such event, initially, by making a data call to the database 138 to obtain the configuration change without interruption, i.e., while the instances continue to handle live traffic in their operating environment(s) without any interruption of processing flow. According to some exemplary embodiments herein, once each such instance retrieves the configuration change value(s) that may need to be updated, each will perform its own internal validation check (e.g., such as coding validation, etc.) in runtime, update its runtime in-memory, copy the configuration change update to the new version, and then update and provide the configuration change(s) to the next update or request that is received and handled.

Figure 2:
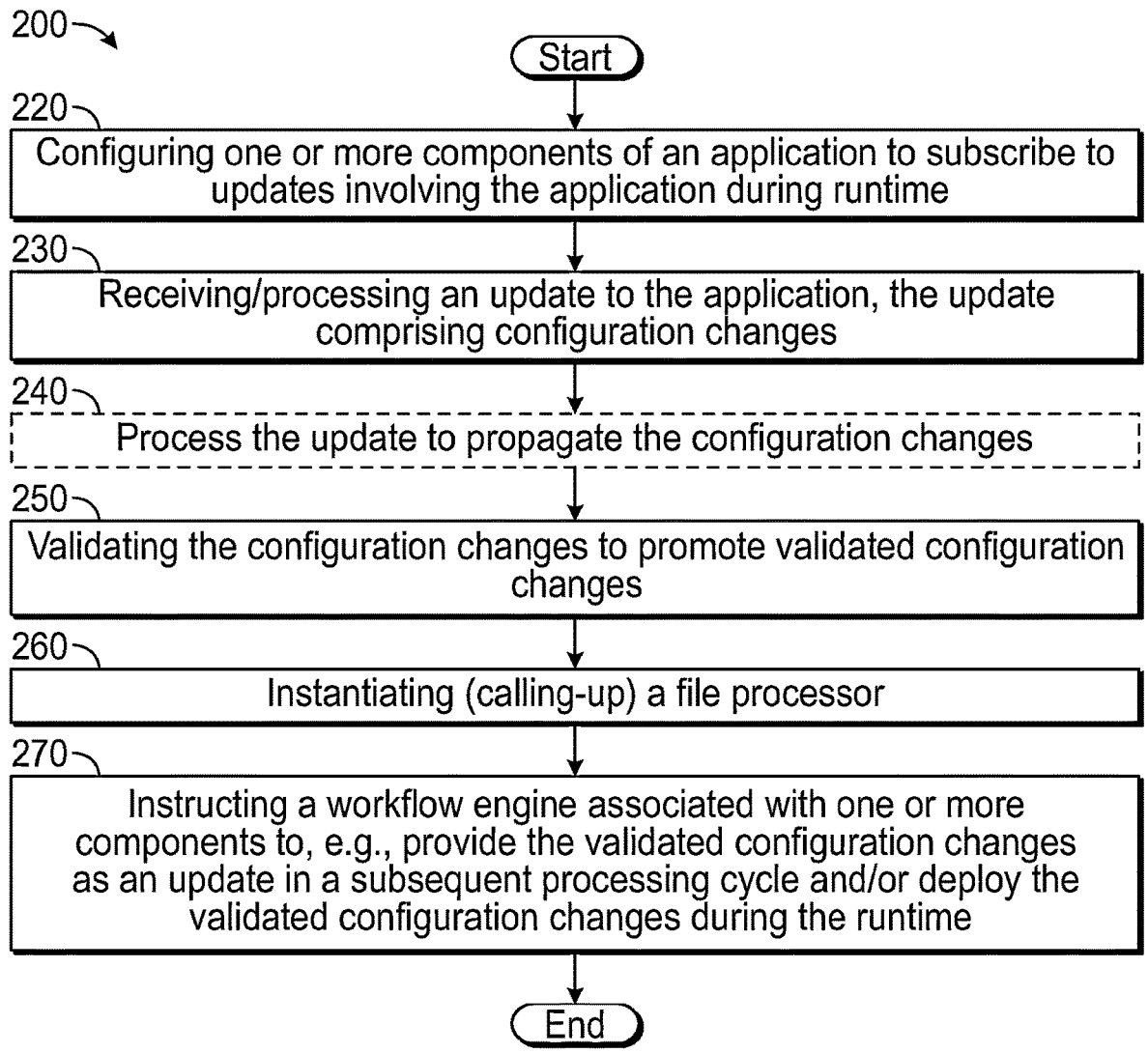
FIG. 2 is a flowchart illustrating one exemplary process related to the dynamic CI/CD pipeline configuration processing herein, consistent with exemplary aspects of at least some embodiments of the present disclosure.

FIG. 2 is a flowchart illustrating one exemplary process 200 related to a dynamic CI/CD pipeline configuration process, consistent with exemplary aspects of at least some embodiments of the present disclosure. As shown in the exemplary flowchart of FIG. 2, an illustrative dynamic CI/CD pipeline configuration process 200 may comprise: configuring one or more components of an application to subscribe to updates involving the application during runtime, at 220; receiving/processing an update to the application, at 230; analyzing the update and processing only configuration changes therein, at 240; validating the configuration changes to form validated configuration changes, at 250; instantiating (calling-up) a file processor, at 260; and instructing a workflow engine associated with the one or more components to, e.g., provide the validated configuration changes as an update in a next processing cycle and/or deploy the validated configuration changes during the runtime, at 270.

Further, in some embodiments, the file processor instantiated at 260 may be configured to write the validated configuration changes to a datastore, and notify one or more components of an application in production, subscribed to receive updates involving the application during runtime, of the configuration changes that have been validated and/or written to the datastore.

According to implementations herein, the dynamic CI/CD pipeline configuration process 200 may include, at 220, a step of configuring one or more components of an application to subscribe to (e.g., receive, etc.) updates involving the application during runtime. The dynamic CI/CD pipeline configuration process 200 may be performed via one or more processors, such as one or more processors of a continuous integration and delivery (CI/CD) pipeline. Further, in some illustrative implementations, such CI/CD pipeline may be associated with a financial service provider (FSP) system. Such FSP system may comprise one or more servers and/or processors associated with a financial service entity that provides, maintains, manages, or otherwise offers financial services. Such financial service entity may include a bank, credit card issuer, or any other type of financial service entity that generates, provides, manages, and/or maintains financial service accounts for one or more customers. With regard to the disclosed innovations, such application may be an application that has already been deployed in production. In other embodiments, the application may have not been deployed in production, or only partially deployed in production.

The dynamic CI/CD pipeline configuration process 200 may include, at 230, a step of receiving and/or processing an update to the application, such as from GitHub 110, the update comprising configuration changes, as may be received via configuration file setup in the application's GitHub repository (where, e.g., they are separated from the code changes); and at 240, a step of handling the update to process only the configuration changes therein. Various embodiments herein may be configured so that such analyzing includes processing the configuration changes, as de-coupled from the code changes, for propagation to subscribed components via processing of the CI/CD pipeline. Here, for example, the disclosed technology and pipeline may then push the configuration changes to the production runtime environment.

Further, the dynamic CI/CD pipeline configuration process 200 may include, at 250, a step of validating the configuration changes to form validated configuration changes. In some embodiments, the validating the configuration changes may comprise validating at least one of: a content of the configuration changes, a format of the configuration changes, and/or a schema of the configuration changes.

The dynamic CI/CD pipeline configuration process 200 may also include, at 260, a step of instantiating (calling-up) a file processor. In some embodiments, the file processor may be configured to store the validated configuration changes to at least one database 138, datastore, or the like. In certain embodiments, the file processor may be further configured to notify the one or more components associated with the pipeline, an application of the configuration changes. According to various implementations, the file processor (FP) may be implemented using various suitable forms, techniques, and/or computing resources, and may include or involve an Amazon AWS lambda processor in one embodiment. Further, in connection with some example embodiments, the at least one datastore may include one or both of: a datastore and an in-line cache.

Additionally, according to various embodiments herein, various instructions, scripts, notifications and/or other functionality may be performed via utilization of at least one post-hook mechanism. For example, in some implementations, various processing may be performed or a notification may be issued based on a post hook (i.e., 'post-receive hook') that may be executed automatically after an operation, such as a specified operation, has completed. Such post hook processing may be utilized herein to automate pieces or aspects of the development processing, i.e., to expedite or optimize the development workflow.

The dynamic CI/CD pipeline configuration process 200 may include, at 270, a step of instructing a workflow engine associated with the one or more components to process the configuration changes for full pipeline deployment, such as, e.g., providing the validated configuration changes as an update in a next processing cycle and/or deploying the validated configuration changes during the runtime. According to various disclosed embodiments, the workflow engine may be further instructed to: 1) determine and/or validate whether the configuration changes are needed for each subject component; 2) update each such subject component in runtime memory with the validated configuration changes; and/or 3) instruct the workflow engine to provide the validated configuration changes as an update in a next processing cycle and thereby deploy the validated configuration changes during the runtime. In some embodiments, the workflow engine may be further configured to retrieve the validated configuration changes via a read-through cache. According to various implementations herein, the read-through cache may be configured with access to the write-through cache.

In some implementations, the workflow engine may comprise a workflow engine (WFE) that comprises multiple instances. According to embodiments utilizing and/or implemented in connection with such workflow engine, the workflow engine may be configured to process the configuration changes including by performing a sequence of operations such as: receiving the notification regarding an event (i.e., the at least one configuration change, update, etc.); retrieving one or more new values associated with the at least one configuration change; validating the one or more new values, internally, during run-time of live traffic, to, e.g., perform a validation check of code execution based on the one or more new values; and updating, once such validation is confirmed, run time processing, including injecting the configuration change into existing runtime code for subsequent execution, i.e., when the next update comes in for handling.

According to some aspects, the workflow engine 144 may be set-up such that it directly accesses the same tables of the database 138 written to by the file processor 130. Further, the workflow engine 144 may be configured to automatically initiate a data call to this same database 138, to thereby read the new configuration changes from the table entries in the database. In one or both of these ways, the workflow engine may avoid interruption of its flow, while running and serving live traffic.

According to some embodiments, systems and methods herein may also include and/or involve storing the validated configuration changes to a write-through cache. In one embodiment, such storing of the validated configuration changes may be performed by the file processor.

Other embodiments consistent with the disclosed technology herein may also comprise utilizing one or more DAX processing components to perform write-through caching of the configuration changes, e.g., to a database 138, datastore, etc.

Figure 3:
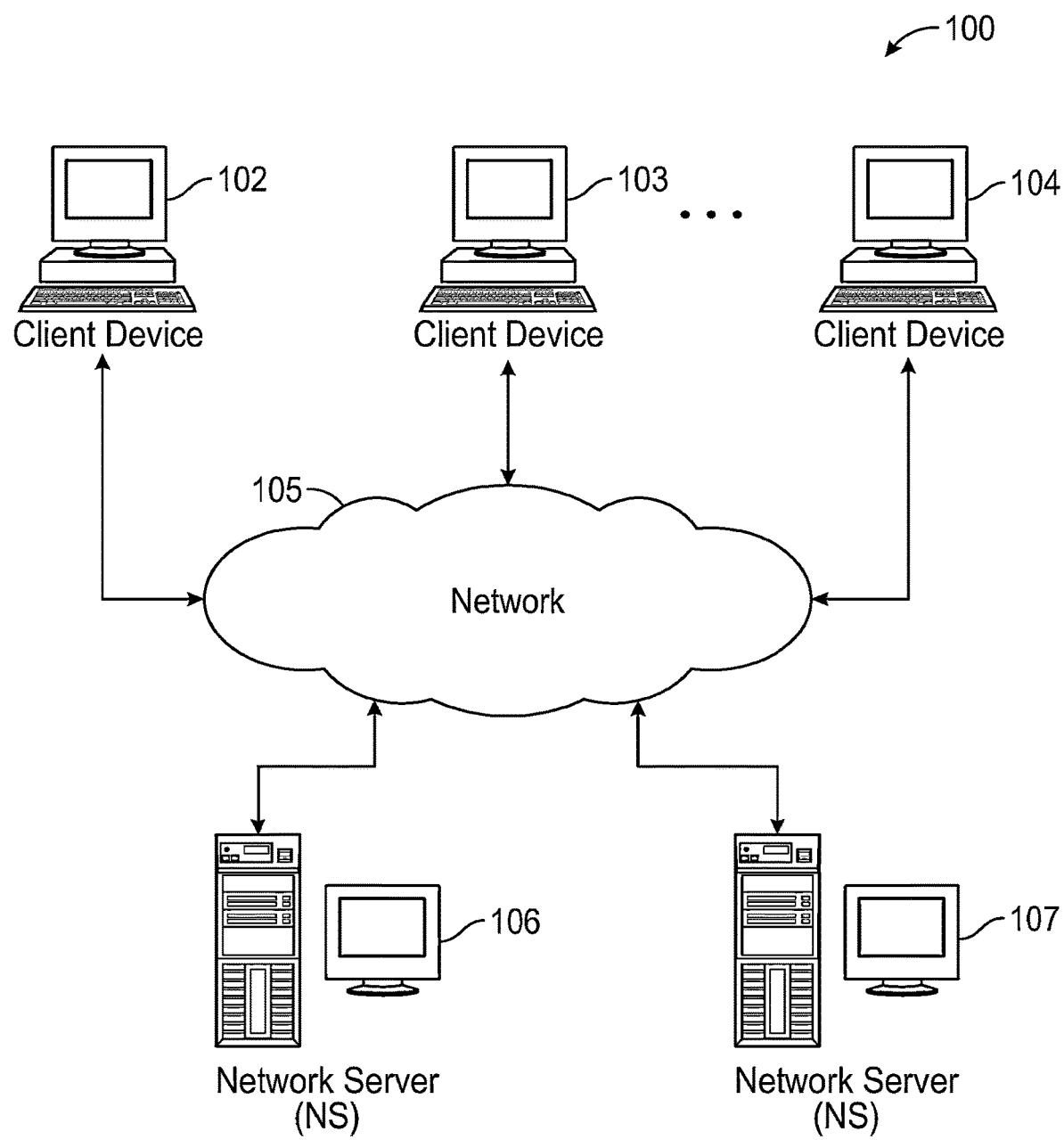
FIG. 3 is a block diagram depicting an exemplary computer-based system and/or platform that may involve features of delivering updates associated with a CI/CD pipeline, in accordance with certain embodiments of the present disclosure.

FIG. 3 is a block diagram depicting an exemplary computer-based system and/or platform that may involve features of dynamic CI/CD pipeline processing, in accordance with certain embodiments of the present disclosure. It is noted, however, that not all of the illustrated components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform may be configured to manage a large number of processes and/or concurrent interactions, as detailed herein. In some embodiments, the exemplary computer-based system/platform may be based on a scalable computer and/or network architecture that incorporates various strategies for assessing the data, caching, searching, and/or database connection pooling. An example of the scalable architecture is an architecture that is capable of operating multiple servers.

In some embodiments, referring to FIG. 3, members 102 through 104 (e.g., clients) of the exemplary computer-based system/platform may include virtually any computing device capable of receiving and sending a message over a network (e.g., organization intranet, cloud network, etc.), such as network 105, to and from another computing device, such as servers 106 and 107, each other, and the like. In some embodiments, the member devices 102 through 104 may be personal computers, multiprocessor systems, microprocessor-based or programmable consumer electronics, network PCs, and the like, with some examples set forth in more detail, below, in connection with FIG. 7.

In some embodiments, the exemplary network 105 may provide network access, data transport and/or other services to any computing device coupled to it. In some embodiments, the exemplary network 105 may include and implement architecture for performing cloud-based computing and/or include or involve specialized network architecture, as described in more detail elsewhere herein. In some embodiments, the exemplary server 106 or the exemplary server 107 may be a web or cloud server (or a series of servers) running a network operating system.

In some embodiments and, optionally, in combination of any embodiment described above or below, for example, one or more exemplary computing member devices 102 through 104, the exemplary server 106, and/or the exemplary server 107 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

It is to be understood that the configuration and boundaries of the functional building blocks of system 100 have been defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 4:
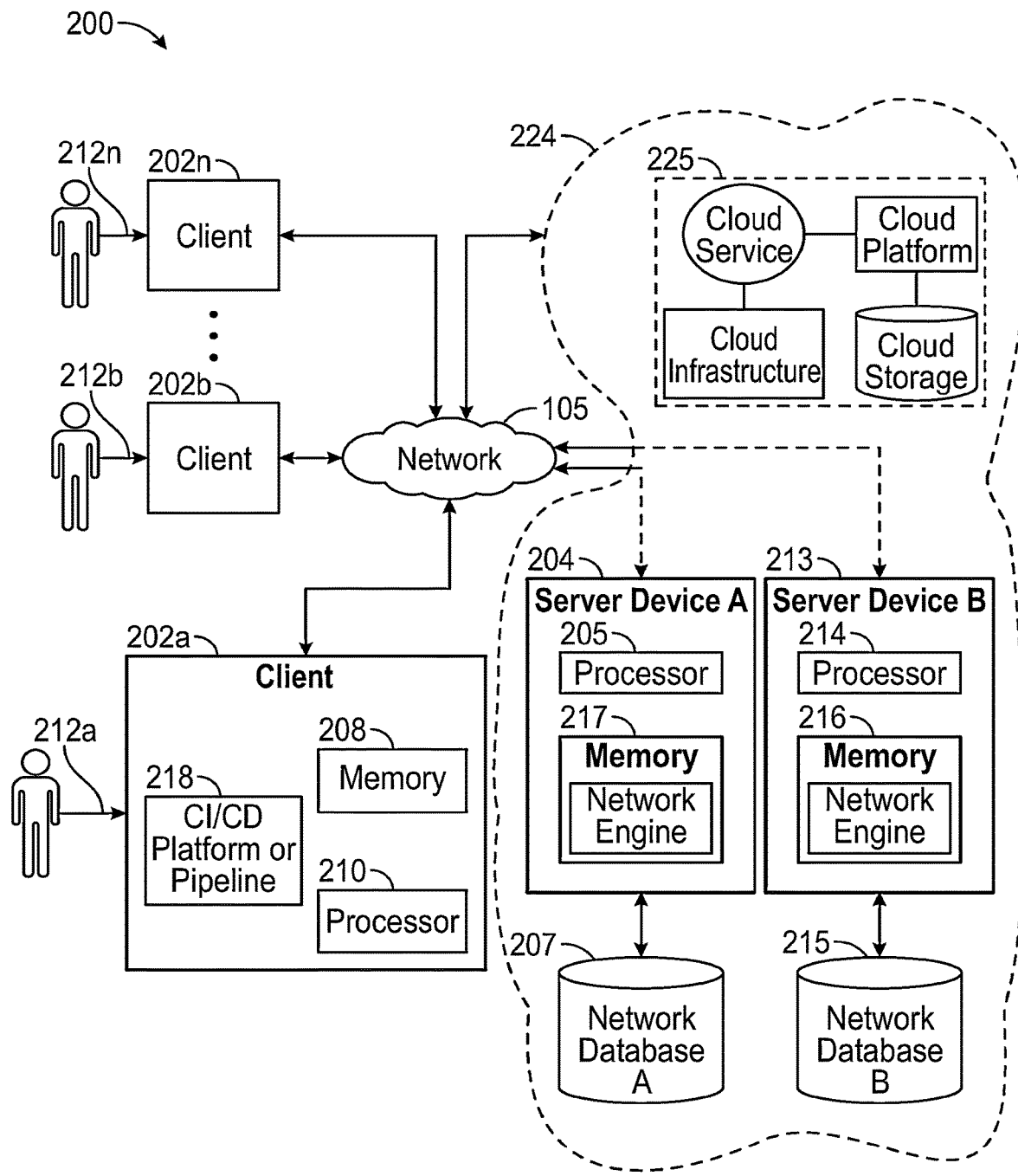
FIG. 4 is a block diagram depicting another exemplary computer-based system and/or platform that may involve features of delivering updates associated with a CI/CD pipeline, in accordance with certain embodiments of the present disclosure.

FIG. 4 is a block diagram depicting another exemplary computer-based system and/or platform that may involve features of checkpoint and build processing, in accordance with certain embodiments of the present disclosure. It is noted that not all of these components may be required to practice one or more embodiments, and variations in the arrangement and type of the components may be made without departing from the spirit or scope of various embodiments of the present disclosure. In some embodiments, the member computing devices 202a, 202b through 202n shown each at least includes a memory 208, such as a random-access memory (RAM) and/or a computer-readable medium, which may be coupled to a processor 210. In some embodiments, the processor 210 may execute computer-executable program instructions stored in memory 208.

Referring to FIG. 4, various computer-executable instructions may be executed in connection with providing a continuous integration, continuous delivery (CI/CD) platform or pipeline 218 that the client 202a may utilize, e.g., to perform or provide various features of dynamic CI/CD pipeline processing or services, such as those associated with software updates, integration, delivery, build, etc. In some embodiments, such CI/CD platform or pipeline 218 may be specific to a single application and executed using a CI/CD tool, like Jenkins. Further, in some implementations, client (e.g. 202a) may be associated with a financial service provider (FSP) entity that provides, maintains, manages, or otherwise offers financial services. For example, the financial service entity may be a bank, credit card issuer, or any other type of financial service entity that generates, provides, manages, and/or maintains financial service accounts for one or more customers. Financial service accounts may include, for example, credit card accounts, loan accounts, checking accounts, savings accounts, reward or loyalty program accounts, and/or any other type of financial service account known to those skilled in the art. In such instances, client 202a may be comprised of a plurality of servers including one or more servers or computer systems that implement the CI/CD platform or pipeline, which may be resident on other servers.

Figure 5:
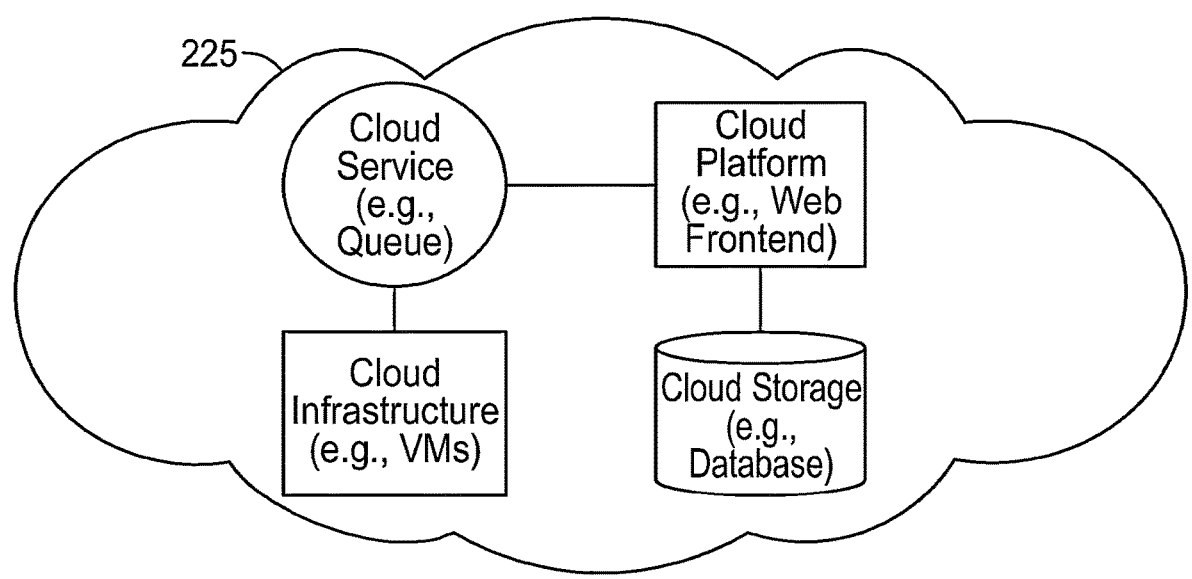
FIGS. 5 and 6 are diagrams illustrating two exemplary implementations of cloud computing architecture/aspects with respect to which the disclosed technology may be specifically configured to operate, in accordance with certain embodiments of the present disclosure.

As shown in FIG. 4, exemplary clients 202 may be also coupled to one or more networks 105 as well as to one or more cloud computing environments 224, which may contain the various cloud processes and cloud services that the CI/CD pipeline 218 works with, initiates, instructs and/or coordinates. As also shown in FIG. 5, exemplary cloud computing environment 224 may include and/or involve one or more servers 204, 213 and/or cloud components 225, which are shown grouped together in the drawing for sake of illustration, though may be distributed in various ways as known in the art. The various different servers 204, 213 may execute the separate cloud processes coordinated via embodiments herein, and each may contain processors 205, 214, memory 217, 216 and associated network or cloud engines. Cloud components 225 may include one or more cloud services such as software applications (e.g., queue, etc.), one or more cloud platforms (e.g., a Web front-end, etc.), cloud infrastructure (e.g., servers 204, 213, virtual machines, etc.), and/or cloud storage (e.g., cloud databases, network databases 207, 215, etc.), which are further discussed in connection with FIGS. 5 and 7.

In some embodiments, one or more databases, such as exemplary databases 207 and 215, may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

In FIGS. 3 and 4, while only one or several of the various system components are shown, it will be understood that these platforms 100, 200 may include more or fewer of any of these components, than depicted. More generally, the components and arrangement of the components included in these platforms 100, 200 may vary. Thus, platforms 100, 200 may include other components that perform or assist in the performance of one or more processes consistent with the disclosed embodiments. Another exemplary, generalized computing platform is further shown and described below in connection with FIG. 7.

As shown in FIGS. 4 and 5, various embodiments of the disclosed technology may include and/or involve one or more cloud components 225, which are shown grouped together in the drawing for sake of illustration, though may be distributed in various ways as known in the art. Cloud components 225 may include one or more cloud services such as software applications (e.g., queue, etc.), one or more cloud platforms (e.g., a Web front-end, etc.), cloud infrastructure (e.g., virtual machines, etc.), and/or cloud storage (e.g., cloud databases, etc.).

Figure 6:
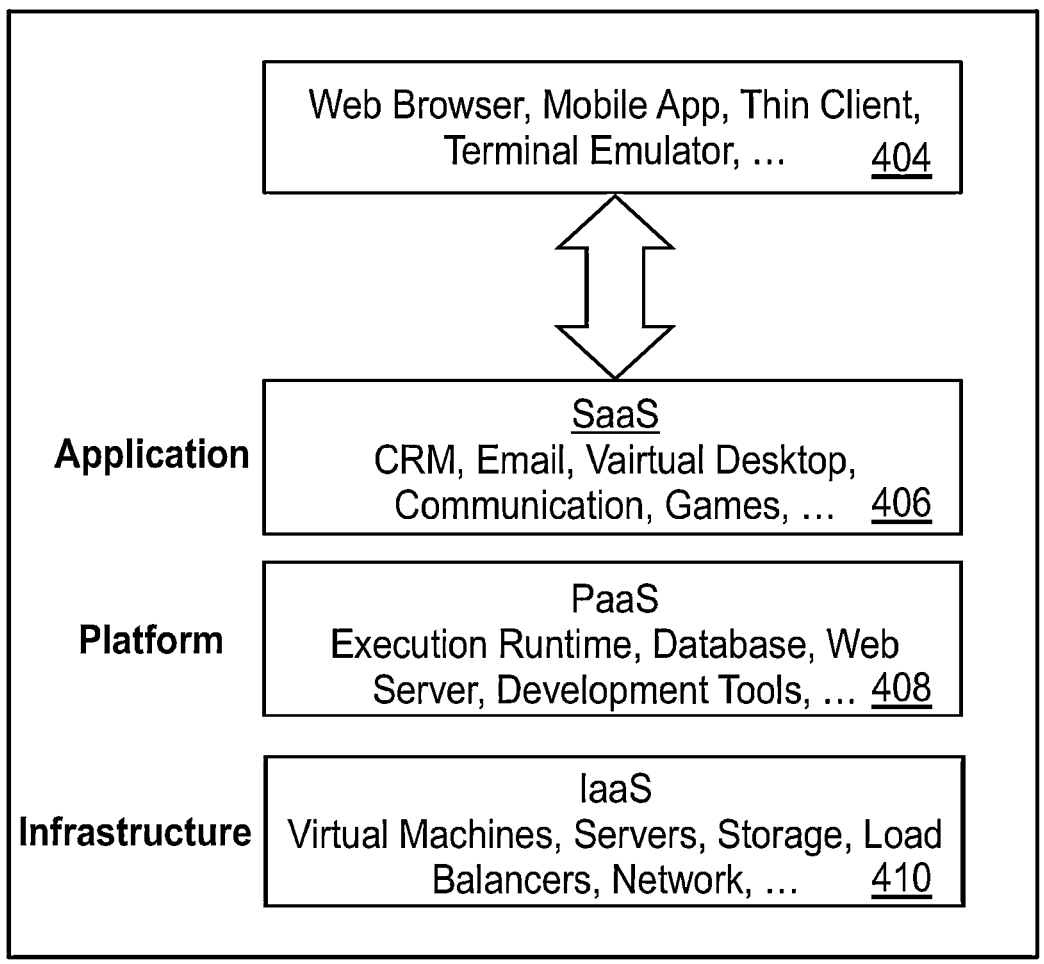

According to some embodiments shown by way of one example in FIG. 6, the exemplary inventive computer-based systems/platforms, the exemplary inventive computer-based devices, components and media, and/or the exemplary inventive computer-implemented methods of the present disclosure may be specifically configured to operate in or with cloud computing/architecture such as, but not limiting to: infrastructure a service (IaaS) 410, platform as a service (PaaS) 408, and/or software as a service (SaaS) 406. In some embodiments, such cloud architecture 406, 408, 410 may be utilized in connection with web browser and/or other network aspects, shown at 404, to provide implementations herein.

Figure 7:
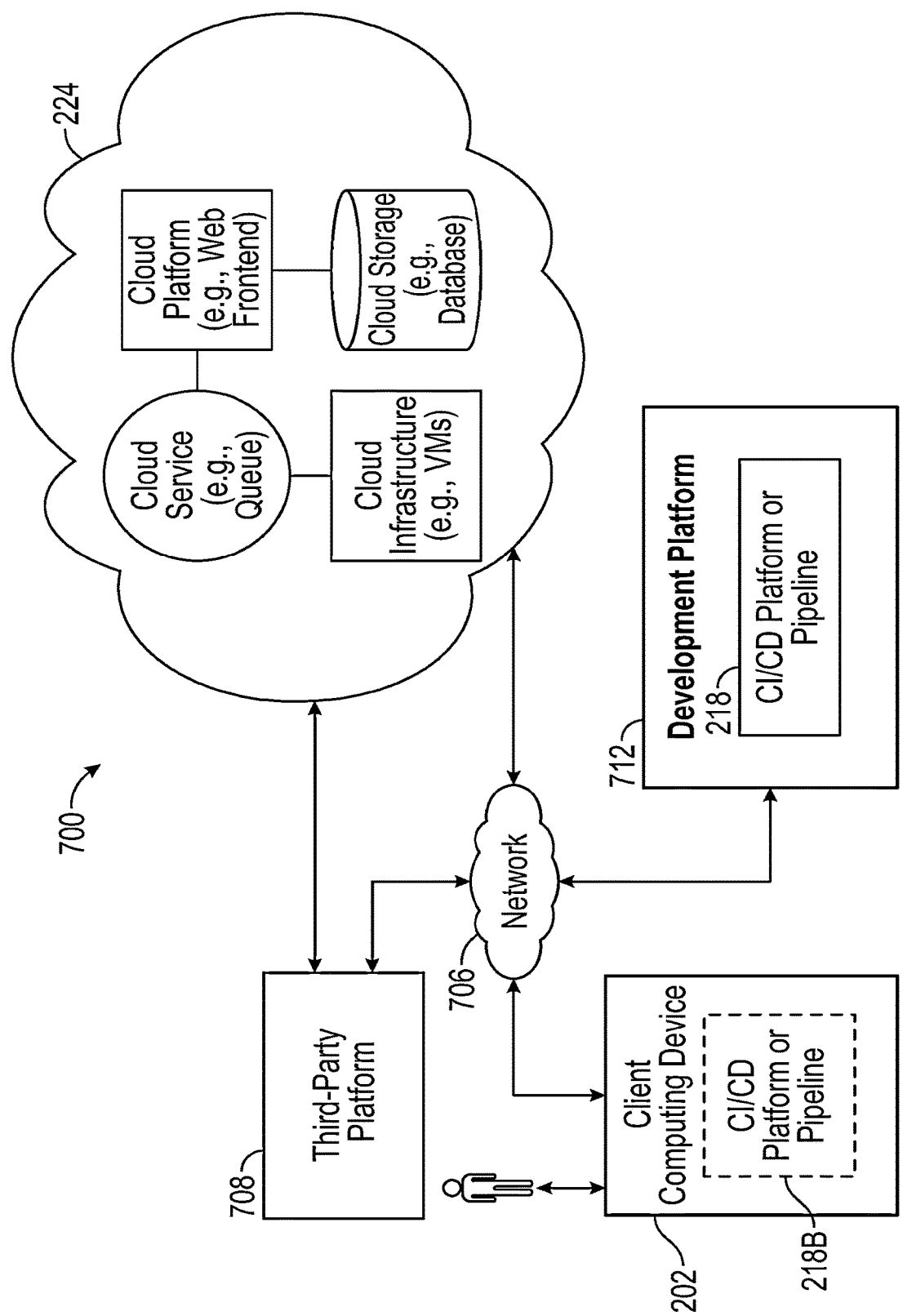
FIG. 7 is a block diagram of an exemplary system and/or platform that may involve features of delivering updates associated with a CI/CD pipeline, consistent with exemplary aspects of certain embodiments of the present disclosure.

FIG. 7 is a block diagram of an exemplary system and/or platform 700 that may involve features of dynamic CI/CD pipeline processing, in accordance with certain embodiments of the present disclosure. System 700 may be configured for executing software applications, such as one or more applications corresponding to the CI/CD platform or pipeline 218 described above in connection with FIG. 4. As shown, system 700 may include a client 202, such as a client computing device or one or more other computing devices, and a network 706 connecting the various system elements. Such client 202 or computing device(s) may be configured to execute, among other programs, the CI/CD platform or pipeline 218, a portion of which may also reside on the client 202 as an application, component, or the like, at 218B. The CI/CD platform or pipeline 218 may be resident in a remote or cloud platform, or otherwise distributed among various servers and/or computing devices, such as a software development platform 712. System 700 may further include one or more third-party platforms, computers or systems 708, such as third-party platforms that perform the various cloud processes initiated by the CI/CD platform or pipeline 218 through the cloud 224. As shown, client computing device 202, third-party platform 708, and development platform 712 may be communicatively coupled by the network 706 and/or at least one cloud 224.

While only one client 202, third-party platform 708, development platform 712, network 706, and cloud 224 are typically shown and discussed, it will be understood that system 700 may include more than one of any of these components. More generally, the components and arrangement of the components included in system 700 may vary. Thus, system 700 may include other components that perform, or are associated with and/or assist in the performance of, one or more processes consistent with the disclosed embodiments.

Network(s) 706 involved with such system 700 may include and/or involve specialized network architecture that may be based at least in part on one or more standards set by, for example, without limitation, GlobalSystem for Mobile communication (GSM) Association, the Internet Engineering Task Force (IETF), and the Worldwide Interoperability for Microwave Access (WiMAX) forum. In some embodiments, the exemplary network 105 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 706 may include and implement, as an alternative or in conjunction with one or more of the above, a WiMAX architecture defined by the WiMAX forum. In some embodiments and, optionally, in combination of any embodiment described above or below, the exemplary network 706 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 706 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 706 may also include mass storage, such as network attached storage (NAS), a storage area network (SAN), a content delivery network (CDN) or other forms of computer- or machine-readable media.

In some embodiments, servers associated with clients 202, development platforms 712 and/or third-party platforms may be web or cloud servers (or a series of servers) running a network operating system, examples of which may include but are not limited to Microsoft Windows Server, Novell NetWare, or Linux. In some embodiments, such servers may be used for and/or provide cloud and/or network computing.

In some embodiments, one or more such servers may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the CI/CD platform or pipeline 218.

In some embodiments, various processors associated with the clients 202, platforms 708, 712, and cloud 224 may include one or more microprocessors, ASICs, state machines, and/or other such known computing and/or processing components. In some embodiments, the system components, servers and/or processors herein may include, or may be in communication with, media, for example computer-readable media, which stores instructions that, when executed by the various computing components, may cause relevant processors to perform one or more steps described herein. In some embodiments, examples of computer-readable media may include, but are not limited to, an electronic, optical, magnetic, or other storage or transmission device capable of providing a processor with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, computing devices associated with components of the system 700 may also comprise a number of external or internal devices such as a mouse, a CD-ROM, DVD, a physical or virtual keyboard, a display, or other input or output devices. In some embodiments, examples of computing devices, such as those associated with clients 202, may be any type of processor-based platforms that are connected to a network 706 such as, without limitation, personal computers, digital assistants, personal digital assistants, smart phones, pagers, digital tablets, laptop computers, Internet appliances, and other processor-based devices. In some embodiments, such computing devices may be specifically programmed with one or more application programs in accordance with one or more principles/methodologies detailed herein.

As used in the description and in any claims, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems/platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), Bluetooth™, near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud components (e.g., FIGS. 10-11) and cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a tweet, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) FreeBSD, NetBSD, OpenBSD; (2) Linux; (3) Microsoft Windows™; (4) OpenVMS™; (5) OS X (MacOS™); (6) UNIX™; (7) Android; (8) iOS™; (9) Embedded Linux; (10) Tizen™;

(11) WebOS™; (12) Adobe AIR™; (13) Binary Runtime Environment for Wireless (BREW™); (14) Cocoa™ (API); (15) Cocoa™ Touch; (16) Java™ Platforms; (17) JavaFX™; (18) QNX™; (19) Mono; (20) Google Blink; (21) Apple WebKit; (22) Mozilla Gecko™; (23) Mozilla XUL; (24) .NET Framework; (25) Silverlight™; (26) Open Web Platform; (27) Oracle Database; (28) Qt™; (29) SAP NetWeaver™; (30) Smartface™; (31) Vexi™; (32) Kubernetes™; (33) Windows Runtime (WinRT™); (34) IBM i™; (35) IBM AIX™; (36) Microsoft DirectX™; (37) Eclipse Rich Client Platform.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Pager, Smartphone, smart watch, or any other reasonable mobile electronic device.

As used herein, the terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

The aforementioned examples are, of course, illustrative and not restrictive.

As used herein, the term "user" shall have a meaning of at least one user. In some embodiments, the terms "user", "subscriber", "consumer", or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

At least some aspects of the present disclosure will now be described with reference to the following numbered clauses.

Clause 1. A computer-implemented method comprising:
configuring, by one or more processors of a continuous integration and delivery (CI/CD) pipeline, one or more components of an application in production to subscribe to (receive) updates involving the application during runtime to form one or more subscribed components, the application being executed in the CI/CD environment;
receiving, by the one or more processors, an update to the application;
analyzing, by the one or more processors, the update to process configuration changes, as de-coupled from code changes, for propagation to the one or more subscribed components via the CI/CD pipeline;
validating, by the one or more processors, the configuration changes to form validated configuration changes;
instantiating (calling-up), by the one or more processors, a file processor that is configured to:
store the validated configuration changes to at least one datastore;
notify the one or more subscribed components of the application of the validated configuration changes; and
instructing, by the one or more processors, a workflow engine associated with the one or more subscribed components to:
determine/validate when each of the validated configuration changes is needed for each subscribed component;
update each subscribed component in runtime memory with at least one needed validated configuration changes from the validated configuration changes; and
provide the validated configuration changes as an update in a next processing cycle and/or deploy the validated configuration changes during the runtime.

Clause 2. The method of clause 1, wherein the validating the configuration changes comprises validating at least one of: a content of the configuration changes, a format of the configuration changes, or a schema of the configuration changes.

Clause 3. The method of clause 1, wherein the at least one datastore comprises one or both of: a datastore and an in-line cache.

Clause 4. The method of clause 1, further comprising storing, by the file processor, the validated configuration changes to a write-through cache.

Clause 5. The method of clause 4, wherein the workflow engine is configured to retrieve the validated configuration changes via a read-through cache, the read-through cache configured with access to the write-through cache.

Clause 6. The method of clause 1, wherein the notifying of the one or more components is performed by a post-hook mechanism.

Clause 7. The method of clause 1, wherein the workflow engine comprises multiple instances.

Clause 8. The method of clause 1 further comprising:
performing, via one or more direct access (DAX) processing components, write-through caching of the configuration changes.

Clause 9. A system comprising:
one or more computing components, computer systems, or servers associated with a continuous integration and delivery (CI/CD) pipeline, the one or more computing components, computer systems, or servers including or operationally coupled to one or more processors; and
at least one computer-readable media and/or memory in communication with the one or more processors and storing instructions that, when executed by the one or more processors, cause the one or more processors to:
configure one or more components of an application in production to subscribe to (receive) updates involving the application during runtime to form one or more subscribed components, the application being executed in the CI/CD environment;
process an update to the application, the update comprising configuration changes;
analyze the update to process the configuration changes, as de-coupled from code changes, for propagation to the one or more subscribed components via the CI/CD pipeline;
validate the configuration changes to form validated configuration changes;
instantiate (call-up) a file processor, such as an Amazon AWS lambda (k) processor, that is configured to:
store the validated configuration changes to at least one datastore;
notify the one or more subscribed components of the application of the validated configuration changes; and
instruct a workflow engine associated with the one or more subscribed components to:
determine/validate whether or not each configuration changes is needed for each subscribed component;
update each subscribed component in runtime memory with at least one needed validated configuration changes from the validated configuration change; and
provide the validated configuration changes as an update in a next processing cycle and thereby deploy the validated configuration changes during the runtime.

Clause 10. The system of clause 9, wherein the instructions comprise at least one instruction configured to further cause the one or more processors to:
validate the configuration changes including at least one of: a content of the configuration changes, a format of the configuration changes, or a schema of the configuration changes.

Clause 11. The system of clause 9, wherein the at least one datastore comprises one or both of: a datastore and an in-line cache.

Clause 12. The system of clause 9, wherein the instructions comprise at least one instruction configured to further cause the one or more processors to:
store by the file processor, the validated configuration changes to a write-through cache.

Clause 13. The system of clause 12, wherein the workflow engine is configured to retrieve the validated configuration changes via a read-through cache, the read-through cache configured with access to the write-through cache.

Clause 14. The system of clause 9, wherein the notifying of the one or more components is performed by a post-hook mechanism.

Clause 15. The system of clause 9, wherein the workflow engine comprises multiple instances.

Clause 16. The system of clause 9, further comprising:
one or more direct access (DAX) processing components that perform write-through caching of the configuration changes.

Clause 17. One or more non-transitory computer readable media for tangibly storing computer program instructions capable of being executed by one or more processors associated with a continuous integration and delivery (CI/CD) pipeline, the computer program instructions comprising instructions for
configuring, by the one or more processors, one or more components of an application in production to subscribe to (receive) updates involving the application during runtime to form one or more subscribed components, the application being executed in the CI/CD environment;
receiving, by the one or more processors, an update to the application, the update comprising configuration changes;
analyzing, by the one or more processors, the update to process the configuration changes, as de-coupled from the code changes, for propagation to the one or more subscribed components via the CI/CD pipeline;
validating, by the one or more processors, the configuration changes to form validated configuration changes;
instantiating (calling-up), by the one or more processors, at least one file processor, that is configured to:
store the validated configuration changes to at least one datastore; and
notify the one or more subscribed components of the application of the validated configuration changes;
instructing, by the one or more processors, a workflow engine associated with the one or more subscribed components to:
determine/validate whether the configuration changes are needed for each component;
update each subscribed component in runtime memory with at least one needed validated configuration changes from the validated configuration changes; and
provide the validated configuration changes as an update in a next processing cycle so as to deploy the validated configuration changes during the runtime.

Clause 18. The computer readable media of clause 17, wherein the computer program instructions further comprise instructions for:
storing, by the file processor, the validated configuration changes to a write-through cache, wherein the workflow engine is configured to retrieve the validated configuration changes via a read-through cache, the read-through cache configured with access to the write-through cache.

Clause 19. The computer readable media of clause 17, wherein the notifying of the one or more components is performed by a post-hook mechanism configured to automatically run after the at least one configuration change is written to the database, to expedite or optimize a development workflow.

Clause 20. The computer readable media of clause 17, wherein the workflow engine comprises a workflow engine configured to:
process the configuration changes including:
receiving the notification regarding the at least one configuration change, update or event;
retrieving one or more new values associated with the at least one configuration change;
validating the one or more new values, internally, during run-time of live traffic, to perform a validation check of code execution based on the one or more new values; and
updating, once validated, run time processing, including injecting the configuration change into existing runtime code for subsequent execution.

Clause 21. The computer readable media of clause 17, wherein the computer program instructions further comprise instructions for
performing, via one or more DAX processing components that expedite and/or optimize writing at least one configuration entry into the database table, write-through caching of the configuration changes.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

The invention claimed is:

1. A method, comprising:
configuring, by one or more processors, one or more components of an application in production to subscribe to receive at least one update involving the application during runtime;
analyzing, by the one or more processors, the at least one update to extract only at least one configuration change, as de-coupled from any code change, for propagation to the one or more subscribed components;
validating, by the one or more processors, the at least one configuration change to form at least one validated configuration change;
deploying, by the one or more processors, the at least one validated configuration change as an update to the one or more subscribed components of the application during the runtime thereof;
instantiating, by the one or more processors, a file processor that is configured to:
write or store the at least one validated configuration change to at least one datastore,
notify the one or more subscribed components of the at least one validated configuration change, and
store the at least one validated configuration change to a write-through cache; and
instructing, by the one or more processors, a workflow engine associated with the one or more subscribed components to:
determine when each of the at least one validated configuration change is needed for each of the one or more subscribed components, and
update each of the one or more subscribed components in at least one runtime memory with at least one needed change from the at least one validated configuration change;
wherein the workflow engine is configured to retrieve the at least one validated configuration change via a read-through cache, the read-through cache configured with access to the write-through cache.

2. The method of claim 1, wherein the one or more processors operate in a continuous integration and delivery (CI/CD) environment.

3. The method of claim 1, wherein the validating the at least one configuration change comprises validating at least one of: a content of the at least one configuration change, a format of the at least one configuration change, a schema of the at least one configuration change, or any combination thereof.

4. The method of claim 1, wherein the at least one datastore comprises one or both of: a datastore and an in-line cache.

5. The method of claim 1, wherein the workflow engine comprises multiple instances.

6. The method of claim 1, wherein the notifying of the one or more components is performed by a post-hook mechanism.

7. The method of claim 1, further comprising performing, via one or more direct access (DAX) processing components, write-through caching of the at least one configuration change.

8. The method of claim 1, wherein the instructing of the workflow engine comprises instructing the workflow engine to perform a data call to the at least one datastore to obtain the at least one validated configuration change.

9. The method of claim 1, wherein the at least one configuration change comprises at least one of: a code change, a business-specific change, a configuration file change, or any combination thereof.

10. The method of claim 6, wherein the notifying of the one or more components is performed by the post-hook mechanism that is configured to automatically run after the at least one configuration change is written to a database to expedite a developmental workflow.

11. A system, comprising:
    one or more computing components, computer systems, or servers including or operationally coupled to one or more processors; and
    at least one computer-readable media and/or memory in communication with the one or more processors and storing instructions that, when executed by the one or more processors, cause the one or more processors to:
    configure one or more components of an application in production to subscribe to receive at least one update involving the application during runtime;
    analyze the at least one update to extract only at least one configuration change, as de-coupled from any code change, for propagation to the one or more subscribed components;
    validate the at least one configuration change to form at least one validated configuration change;
    deploy the at least one validated configuration change as an update to the one or more subscribed components of the application during the runtime thereof;
    instantiate a file processor that is configured to:
        write or store the at least one validated configuration change to at least one datastore,
        notify the one or more subscribed components of the at least one validated configuration change, and
        store the at least one validated configuration change to a write-through cache; and
    instruct a workflow engine associated with the one or more subscribed components to:
        determine when each of the at least one validated configuration change is needed for each of the one or more subscribed components; and
        update each of the one or more subscribed components in at least one runtime memory with at least one needed change from the at least one validated configuration change;
            wherein the workflow engine is configured to retrieve the at least one validated configuration change via a read-through cache, the read-through cache configured with access to the write-through cache.

12. The system of claim 11, wherein the instructions are configured to further cause the one or more processors to:
    validate the at least one configuration change including at least one of: a content of the at least one configuration change, a format of the at least one configuration change, a schema of the at least one configuration change, or any combination thereof.

13. The system of claim 11, wherein the at least one datastore comprises one or both of: a datastore and an in-line cache.

14. The system of claim 11, wherein the notifying of the one or more components is performed by a post-hook mechanism.

15. The system of claim 11, the instructions are configured to further cause one or more direct access (DAX) processing components to perform write-through caching of the at least one configuration change.

16. The system of claim 11, wherein the instructions are configured to instruct the workflow engine to perform a data call to the at least one datastore to obtain the at least one validated configuration change.

17. The system of claim 11, wherein the at least one configuration change comprises at least one of: a code change, a business-specific change, a configuration file change, or any combination thereof.

18. The system of claim 14, wherein the notifying of the one or more components is performed by the post-hook mechanism that is configured to automatically run after the at least one configuration change is written to a database to expedite a developmental workflow.

* * * * *